United States Patent
Cao et al.

(10) Patent No.: US 6,965,849 B1
(45) Date of Patent: Nov. 15, 2005

(54) METHOD OF DESIGNING GEOPHYSICAL SURVEYS

(75) Inventors: Di Cao, Yokohama (JP); Kenzo Hara, Fujisawa (JP)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/501,445

(22) Filed: Feb. 10, 2000

(51) Int. Cl.[7] ............................. G06G 7/48; H04H 9/00
(52) U.S. Cl. ............................. 703/10; 367/73; 367/86
(58) Field of Search ..................... 703/9–10; 367/73, 367/86

(56) References Cited

U.S. PATENT DOCUMENTS

| | | | | |
|---|---|---|---|---|
| 5,081,611 A | * | 1/1992 | Hornby | 367/25 |
| 5,394,325 A | | 2/1995 | Schneider | |
| 5,450,370 A | | 9/1995 | Beasley, et al. | |
| 5,583,825 A | * | 12/1996 | Carrazzone et al. | 367/31 |
| 5,838,634 A | * | 11/1998 | Jones et al. | 367/73 |
| 5,852,588 A | * | 12/1998 | de Hoop et al. | 367/38 |
| 5,995,446 A | | 11/1999 | Meyer. et al. | |
| 6,049,758 A | * | 4/2000 | Bunks et al. | 702/14 |
| 6,128,577 A | * | 10/2000 | Assa et al. | 702/2 |
| 6,191,787 B1 | * | 2/2001 | Lu et al. | 345/418 |

FOREIGN PATENT DOCUMENTS

| | | |
|---|---|---|
| EP | 0 297 737 A | 1/1989 |
| WO | WO 9954758 A | 10/1999 |

OTHER PUBLICATIONS

"Release Notes. GeoFrame 3.7", Schlumberger Manual, Aug., 1999, no page #'s given.

Chapman, C.H. and Drummond, R., Body-wave seismograms in inhomogeneous media using Maslov asymptotic theory, Bull. Seism. Soc. Amer., 1982, 72; S277-S317.

Coates, R.T. and Chapman, C.H., Ray perturbation theory and the Born approximation, Geophys. J. Int. 1990, 100, 379-392.

* cited by examiner

*Primary Examiner*—Hugh Jones
(74) *Attorney, Agent, or Firm*—Karan Singh; Bill Batzer; Dale Gaudier

(57) ABSTRACT

A method for the design of VSP surveys for the purpose of imaging a reef in the formations surrounding the well in question. The basic steps include:
- building a geophysical model;
- defining receiver locations in the well within the model;
- defining the target (reef);
- ray tracing from receivers to surface via target;
- defining source locations on surface based on ray density pattern; and
- validate by ray tracing from source locations to receiver locations via target.

13 Claims, 2 Drawing Sheets

METHOD OF DESIGNING GEOPHYSICAL SURVEYS

FIELD OF THE INVENTION

The present invention relates to methods for designing geophysical surveys such as seismic surveys. In particular, the methods involve determining the positions of sources and receivers for conducting the survey, especially in borehole seismic surveys such as vertical seismic profiles.

BACKGROUND OF THE INVENTION

The general arrangement of a vertical seismic profile (VSP) survey is shown in FIG. 1. A tool 10, typically comprising and array of seismic receivers (e.g. geophones) 12, is positioned in a borehole 14 by means of a logging cable 16 connected to surface equipment 18. One or more seismic sources 20 (e.g. airguns) are positioned at the surface some distance from the borehole 14. When the source(s) is fired, seismic waves S travel through the formations 22 surrounding the borehole 14 and are reflected in part from changes in acoustic impedance in the formations due to the presence of bed boundaries 24, and are detected by the receivers 12 in the borehole 14. The signals recorded from the receivers 12 can be interpreted by use of a suitable geophysical model to characterise the formations 22, especially the shape and location of the boundary 24. Often the VSP survey is designed with the intention of investigating a particular area or target within a roughly known boundary. Variations of such surveys can include reverse VSP (sources in borehole, receivers at the surface), walkaway VSP (measurements made from a series of source firing as it is moved progressively further from the borehole), 3D VSP (use of a 2D array of sources at the surface), and drill bit seismic (drill bit as source of signals, receivers at the surface). Tools and techniques for use in VSP surveys are generally well known in the oil and gas industry.

In designing a seismic survey, attention must be paid to the particular regime in which the survey is to be conducted. For a typical surface seismic survey (both sources and receivers located at the surface), reflection wave propagation is essentially symmetric from the source to reflecting boundary and back to the receiver. The symmetry is modified by aspects such as the structure of the underground formations but this can be take into account by using a model which can anticipate such changes. Also, P-S conversion in the waves can result in asymmetry. Borehole seismic surveys such as VSPs are by their very nature asymmetric. Therefore, the problem of designing them is more complex. Since the object of a VSP is often to characterise a region of a boundary (a "target"), especially if the object is to image this target, the positioning of the tool in the borehole and the positioning of the source(s) at the surface is important if the appropriate reflected signals are to be recorded in the borehole. However, it is often the case that it is not possible to have a completely free hand when it comes to positioning the source and receivers. For example, surface geographical features (rivers, lakes, cliffs, gullies, etc.) can limit the ability to place the sources. Also, aspects of the borehole (direction, casing, production and completion equipment) can limit the ability to position the tool in the borehole. Finally, financial and time considerations can also apply limiting the number of sources available or the ability to make measurements with the tool at a number of locations in the borehole.

A typical job design process involves identifying the possible positions for the particular number of sources and receivers available for that job, and using a geophysical model of the underground formations to trace ray paths from the source(s) to the receivers. The positions of the sources and receivers are then adjusted until the model shows that the detected signals arrive from the target. The adjustment of the positions is performed by the user who uses experience and available information to estimate the effect of changing the positions before testing using the model. This makes the whole design process highly dependent on the skill and experience of the user.

It is an object of the present invention to provide a method suitable for designing geophysical surveys and in particular for identifying suitable positions for sources and receivers.

SUMMARY OF THE INVENTION

The present invention provides methods of designing geophysical surveys, comprising:
- defining a target of interest;
- defining a receiver location region in a predetermined position relative to the target;
- defining positions within the receiver location region for a predetermined number of receivers;
- preparing a geophysical model which includes the target, the receiver location region and a source location region;
- using the model to propagate ray traces from the receiver positions to the source location region via the target;
- sub-dividing the source location region according to ray trace density resulting from the propagation; and
- designating one or more potential source positions according to the ray trace density in a respective sub-division.

The geophysical survey can be a seismic survey, preferably a borehole seismic survey. Such a survey can include receiver locations in a borehole and source locations at the surface. In such surveys, the number and position of receivers is often less variable than the number and/or position of sources. Consequently, the approach of propagating ray traces from the receivers to the surface via the target allows an appropriate source location to be defined. In certain circumstances it is also possible to use the same approach with a predetermined number of sources in a source location, and to propagate ray traces to define receiver locations.

The method provided by the invention is applicable to surface seismic, VSP, 3D VSP, reverse VSP, drill bit seismic and other such surveys.

The target will typically comprise a region in a horizon in the formations around a borehole. One particular example is an area surrounding a reef in a horizon. The target can typically be designated on the basis of an earlier seismic survey, such as a surface survey.

The receiver location is typically within a borehole and may comprise a portion of the borehole in which it is considered possible to position one or more receivers. More than one location is also possible. The receiver positions can be determined using knowledge of the receiver separations of a tool to be used or can be equidistant spacings in the receiver location give the number of receivers to be used. For example, for a given interval of borehole, if a known number of receivers will be used, the first set of positions can be equally spaced along that interval.

The geophysical model can be of a type generally used in designing seismic surveys. The model needs sufficient detail to identify the target but does not need to be of exceptional accuracy or resolution, for example a macro-model will be appropriate. A suitable model will include the reflecting horizons and the assumed acoustic impedances of the layers of formation in the model. The model includes in it the receiver location and positions, typically located in the position of a borehole included in the model. The surface will also be defined to allow source location regions to be defined.

Ray traces can be propagated using the model from each receiver position to the surface in the source location region. This based on the theory of reciprocity of ray paths between sources and receivers. In cases where the source positions can be specified more accurately than the receiver positions, ray tracing can be from source to receivers. The result of this ray tracing will be a ray trace density distribution in the source location region. By sub-dividing this region according to ray trace density, it is possible to identify those positions with a high ray trace density which will correspond to optimum positions for sources in that region. Because of the reciprocity, a position in the source region with high ray trace density will result in a high signal level in the receiver location region previously defined. A visual display can show the source positions by use of colour, shading or any other visual symbol.

A particularly preferred embodiment of the invention is implemented on a computer with the receiver location region and position, target and source location region being defined on a display, and the ray paths and source positions being determined by operation of a suitable program.

DESCRIPTION OF THE PREFERRED EMBODIMENT

The present invention will now be described by way of example, with reference to the accompanying drawings. In the particular case described, the invention is implemented in a software environment such as GeoFrame available from Schlumberger GeoQuest but it will be appreciated that the methodology described can be applied to other such environments while still retaining the essential features of the invention and so is not limited to implementation in this environment. Unless otherwise specified, functional elements referenced in this description can be found in GeoFrame.

Figure 1:
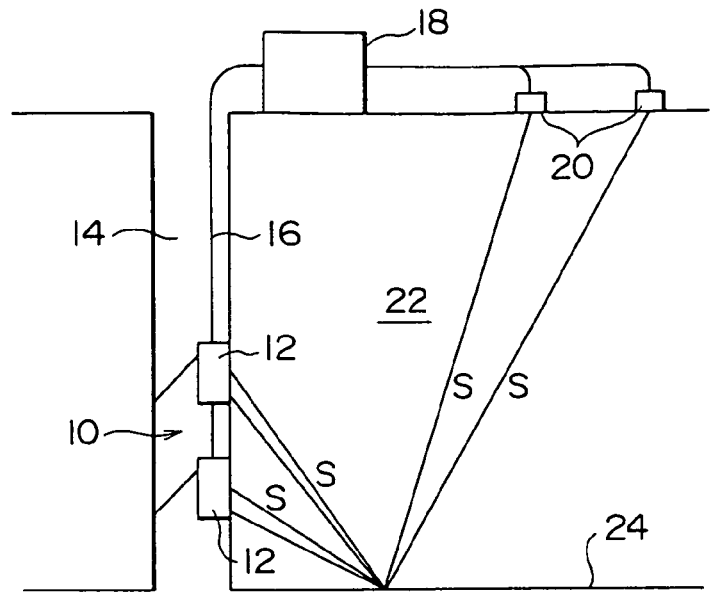
FIG. 1 shows a prior art VSP configuration.
Figure 2:
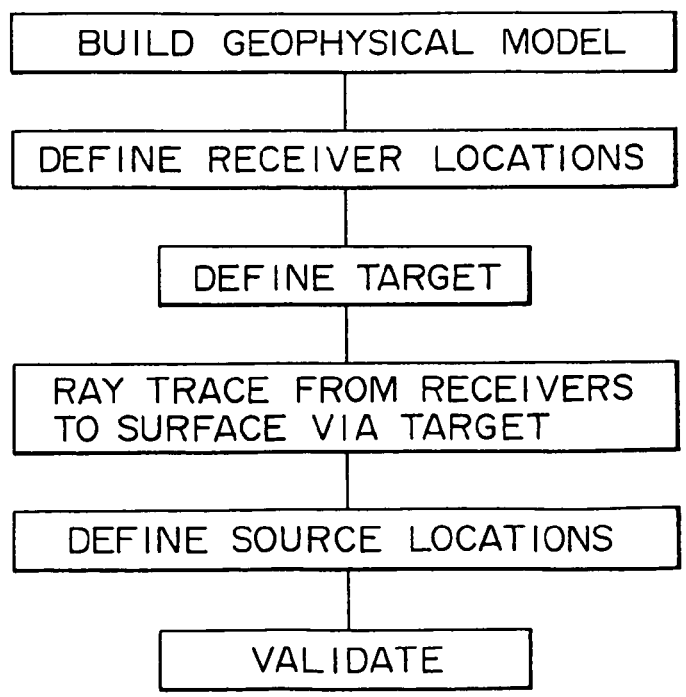
FIG. 2 shows a flow diagram of a method according to the invention.

The embodiment of the invention described here is the design of a VSP survey for the purpose of imaging a reef in the formations surrounding the well in question. The basic steps are shown in FIG. 2 and in this case comprise:

building a geophysical model;
defining receiver locations in the well within the model;
defining the target (e.g. reef);
ray tracing from receivers to surface via target;
defining source locations on surface; and
validate by ray tracing from source locations to receiver locations via target.

Building the Geophysical Model

Figure 3:
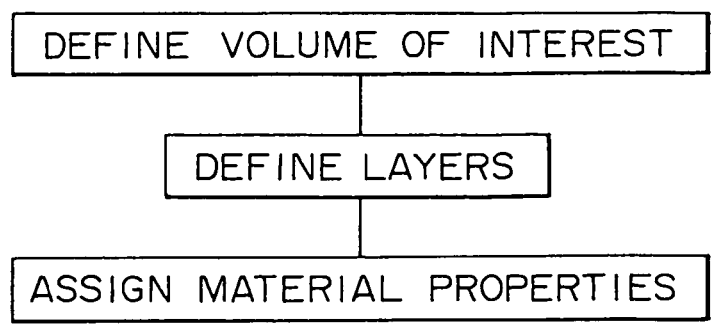
FIG. 3 shows a flow diagram of the steps in building a geophysical model.

The invention requires the use of a geophysical model, that is to say a representation of the three dimensional properties of the underground formations in the region being investigated. Such a model can be formulated using the Common Model Builder of GeoFrame and inputting suitable geophysical data, such as surface seismic data that has been interpreted using appropriate known methodologies. The general approach in the preferred embodiment is to generate a model by defining the volume of interest; assigning surfaces to the volume of interest, the surfaces defining the boundaries between layers of different properties; and defining the properties of the layers (see flow chart of FIG. 3).

Defining Volume of Interest (VOI)

The VOI is defined relative to a datum point in terms of extent in Cartesian co-ordinates X, Y and Z. The upper Z limit being the surface. The VOI is therefore a 3D matrix in which the operations of the invention will be conducted. The VOI must include the target of interest (e.g. the reef), seismic receiver locations (e.g. the well), and source locations (e.g. ground surface or sea bed).

Import Surfaces

GeoFrame can have a number of 2D grid files representing surfaces stored. The 2D grid files are essentially 2D matrices in the XY plane of data points relating to the Z dimension of the surface at that point. Importing the 2D grid files to the volume of interest creates a series of surfaces extending across the XY co-ordinates and varying in the Z co-ordinate. Typically, one or more of these surfaces will include features of the target of interest. For example, the lowest surface might include a feature such as a reef which it is desired to image with a VSP survey. Each surface will typically be assigned a name and, if computational power is limited, the data contained in the grid file may be compressed or decimated to some degree. The top of the model (typically ground level or sea bed) may be already present in the model or may be considered flat according to requirements.

Assign Material Properties

Adjacent surfaces define volumes or layers of the formation which will have different material properties. The properties can be assigned and can be derived from well logs, offset data or other models. The material properties can include Vp/Vs ratio (ratio of compressional and shear velocities), Vp (compressional velocity) value and density of the formation. In a simple model, these values can be fixed, the layer describing a homogenous isotropic formation. More sophisticated models can allow for variation of these properties with distance from a datum point according to a predetermined gradient and/or within predefined limits for an inhomogenous and/or anisotropic formation. Since the purpose of this model is for designing a VSP survey, the properties assigned will be those that affect propagation of seismic waves through the formation.

Figure 4:
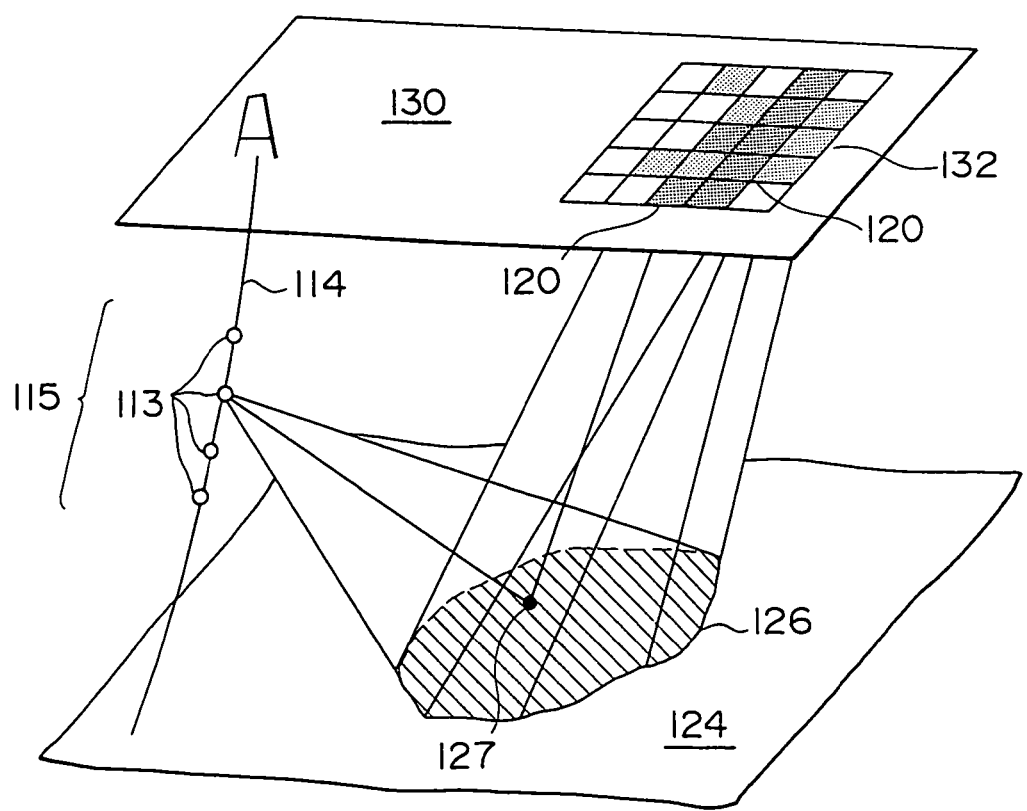
FIG. 4 shows a schematic view of a geophysical model with the borehole, receivers, target and ray tracing displayed thereon.

This model can conveniently be displayed in visual form on a screen so as to be manipulated by a user within a suitable graphical user interface environment. Having built the geophysical model, the borehole, receiver location, target and source locations can be defined. FIG. 4 shows a schematic view of a simple one layer model (two surfaces, ground level and target) for ease of understanding.

Defining Receiver Locations

Once the model has been constructed, receiver locations can be defined. In the case of a VSP survey, the receivers 113 are located within a borehole 114. In order to image the target, seismic signals are generated at the surface, propagate down through the formations, are reflected back up from the target and received in the borehole. Consequently, it is necessary to select a portion 115 of the borehole 114 above the surface 124 with the target. Other matters which might affect the selection of the portion of the borehole in which the receivers 113 will be placed are size of the borehole, presence or absence of casing, hole condition, direction and inclination of borehole trajectory, etc. Having taken the appropriate factors into consideration, the receiver location can be defined in the model in terms of the X, Y and Z co-ordinates of the upper and lower limits of the receiver location 115 (borehole). Also, the number of receivers in the borehole is defined. In a simple form, receivers 113 can be considered equally spaced though the portion 115 of the borehole 114 defined. Alternatively, a number of receivers can be distributed within a more limited part of this location.

Defining Target

The target, a reef 126, appears in one of the surfaces 124 of the model. This surface is selected and the portion of the surface (polygon) 126 containing the reef is defined in terms of X, Y and Z co-ordinates defining a sub-volume.

Ray Tracing to Surface

The next step is to trace ray paths R' from the receivers 113 to the target 126 and determine where rays R" will intersect the ground surface 130 when reflected by the target 126 and propagated through the layers of the model. Ray theory is used to trace the ray paths by means of algorithms coded into a suitable software package. No one particular implementation of such a software package is believed to be preferable over any other and a number of such packages are known to be available (general references for the techniques used can be found in a number of publications, for example Chapman, C. H. and Drummond, R., 1982, *Body-wave seismograms in inhomogeneous media using Maslov asymptotic theory, Bull. Seism. Soc. Amer.*, 72, S277–S317, and Coates, R. T. and Chapman, C. H., 1990, *Ray perturbation theory and the Born approximation, Geophys. J. Int.* 100, 379–392). A suitable package will have the following features:

Dynamic ray tracing in inhomogeneous isotropic or anisotropic, tesselated 3D models (other alternatives are hybrid/irregular grid models);

Library developed on ray shooting methods where the ray (Hamilton) equations (ordinary differential equations) are solved;

Useful in models with general geometry and velocity functions;

Ray types (reflections, converted waves, transmissions and multiples) can be defined generally and precisely;

General heterogeneity of geophysical properties allowed;

General elastodynamic rays allowed;

Kinematic and dynamic ray results; and

Fast and efficient paraxial interpolation and extrapolation.

The preferred way to define ray traces is to define a ray tracing cone for each receiver 113. This is defined by the cone angle, the number of points around the circumference of each cone at which a ray is propagated and the number of concentric cones for each receiver. The azimuth and inclination of each receiver cone is set such that the ray traces intersect the target. For example, each receiver can have five concentric cones each separated by 1°, each cone propagating a ray every 30° of azimuth. Once the ray tracing cones are specified and directed at the target, the rays can be propagated from each receiver to the target and then (reflected) on to the surface, taking into account of the formation properties as defined in the model. Where the rays intersect the surface (upper limit) of the model, a ray density histogram 132 can be determined. This can include the simple geometric density (number of rays for a given surface area) or can include dynamic effects indicating the most energetic path to the surface (i.e. the effective energy flux at the surface for a given ray path). The histogram in this case indicates the regions of high energy at the surface being a combination of the number of ray paths and the energetic nature of these paths.

Define Source Locations

Using the ray density histogram 132, one or more source locations 120 can be defined. Because the ray propagation is reciprocal between sources and receivers, a high ray density at the surface when propagated from the receivers means that a source placed at that point and rays propagated through the same model to the target will result in a relatively high ray density at the borehole. Since surface features can limit the ability to position a source, it is not always possible to position the source at the highest density position. However, selecting one or more of the highest density locations should provide relatively high signal levels at the borehole.

Validate

The source location selected can be validated by ray tracing from the source location to the target and on to the borehole. The reflection points 127 on the target can be indicated and verified that the appropriate coverage will be obtained. At the same time, synthetic seismograms can be generated in order to verify the recorded energy level at the receivers and the appropriate source frequency as well.

We claim:

1. A computer implemented method of designing geophysical surveys, comprising:
   i) defining a target of interest;
   ii) defining a receiver location region in a predetermined position relative to the target;
   iii) defining positions within the receiver location region for a predetermined number of receivers;
   iv) preparing a geophysical model which includes the target, the receiver location region and a source location region;
   v) using the model to propagate ray traces from the receiver positions to the source location region via the target;
   vi) sub-dividing the source location region according to ray trace density resulting from the propagation; and
   vii) designating one or more potential source positions according to the ray trace density in a respective sub-division.

2. A method as claimed in claim 1, wherein the geophysical survey comprises a borehole seismic survey.

3. A method as claimed in claim 2, wherein the target comprises a region of a surface of a formation surrounding the borehole.

4. A method as claimed in claim 2, wherein the receiver location region comprises a portion of the borehole in which one or more receivers can be positioned.

5. A method as claimed in claim 1, wherein the geophysical model includes identification of layers of underground formations and material properties of these layers.

6. A method as claimed in claim 1, further comprising constructing a ray trace density histogram in the source location and using this histogram to define the source locations.

7. A method as claimed in claim 1, wherein the step of preparing a geophysical model comprises the steps of:
   a) defining a volume of interest;
   b) defining surfaces within the volume of interest to delimit layers of the model; and
   c) assigning material properties to the layers of the model.

8. A method as claimed in claim 7 wherein the surfaces are defined in terms of two dimensional arrays of data representing surface position at that point in a third dimension.

9. A method as claimed in claim 7, wherein the material properties include Vp/Vs ratio, compressional velocity, and density.

10. A method as claimed in claim 7 further comprising defining a borehole location within the volume of interest.

11. A method as claimed in claim 7, wherein one of the surfaces contains the target and including the step of defining a portion of the surface containing the target.

12. A method as claimed in claim 1, wherein the step of propagating ray traces from the receiver locations to the source locations comprises defining at least on ray tracing cone for each receiver location, and adjusting the direction and inclination of the cone to intersect the target.

13. A method as claimed in claim 1, further comprising validating designated potential source locations by propagating ray traces from the potential source locations back to the receiver locations via the target, and identifying on the target reflection points for the ray traces.

* * * * *